United States Patent [19]

O'Neil et al.

[11] Patent Number: 6,128,279
[45] Date of Patent: Oct. 3, 2000

[54] SYSTEM FOR BALANCING LOADS AMONG NETWORK SERVERS

[75] Inventors: Kevin M. O'Neil, Plymouth; Robert F. Nerz, Attleboro; Robert R. Aubin, Foxboro, all of Mass.

[73] Assignee: Web Balance, Inc., Foxboro, Mass.

[21] Appl. No.: 09/164,499

[22] Filed: Oct. 1, 1998

Related U.S. Application Data

[60] Provisional application No. 60/071,039, Jan. 13, 1998, and provisional application No. 60/061,170, Oct. 6, 1997.

[51] Int. Cl.[7] .............................. H04L 12/28; H04J 1/00; G06F 15/16; G06F 9/00
[52] U.S. Cl. .................... 370/229; 370/401; 370/402; 709/223; 709/226; 709/243
[58] Field of Search .................................. 370/229, 480, 370/259, 401, 524, 231, 402, 237; 709/221, 223, 238, 105, 226; 395/200.53, 675, 200.31, 672, 674, 200.54

[56] References Cited

U.S. PATENT DOCUMENTS

| | | | |
|---|---|---|---|
| 5,539,883 | 7/1996 | Allon et al. | |
| 5,774,660 | 6/1998 | Brendel et al. | 395/200.31 |
| 5,774,668 | 6/1998 | Choquier et al. | 395/200.53 |
| 5,867,706 | 2/1999 | Martin et al. | 395/675 |
| 5,923,875 | 7/1999 | Tabuchi | 395/675 |
| 5,978,844 | 11/1999 | Tsuchiya et al. | 709/221 |

FOREIGN PATENT DOCUMENTS 2 309 558   7/1997   United Kingdom .

OTHER PUBLICATIONS

Shivaratri, N.G., et al. "Load Distributing for Locally Distributed Systems," *Computer* vol. 25 (Dec. 1992) No. 12: pp. 33–44.

Mourad, A. and Liu, H. "Scalable Web Server Architectures," *IEEE* (Jul. 1, 1997): pp. 12–16.

Kumar, A., et al. "A Model for Distributed Decision Making: An Expert System for Load Balancing in Distributed Systems," *Proceedings of the Annual International Computer Software and Applications Conference (COMPSAC), Tokyo, Oct. 7–9, 1987* No. Conf. 11: pp. 507–513.

*Primary Examiner*—Huy D. Vu
*Assistant Examiner*—M. Phan
*Attorney, Agent, or Firm*—Nutter, McClennen & Fish LLP; David J. Powsner

[57] ABSTRACT

A system which distributes requests among a plurality of network servers receives a request from a remote source at a first one of the network servers, and determines whether to process the request in the first network server. The request is processed in the first network server in a case that it is determined that the request should be processed in the first network server. On the other hand, the request is routed to another network server in a case that it is determined that the request should not be processed in the first network server.

9 Claims, 6 Drawing Sheets

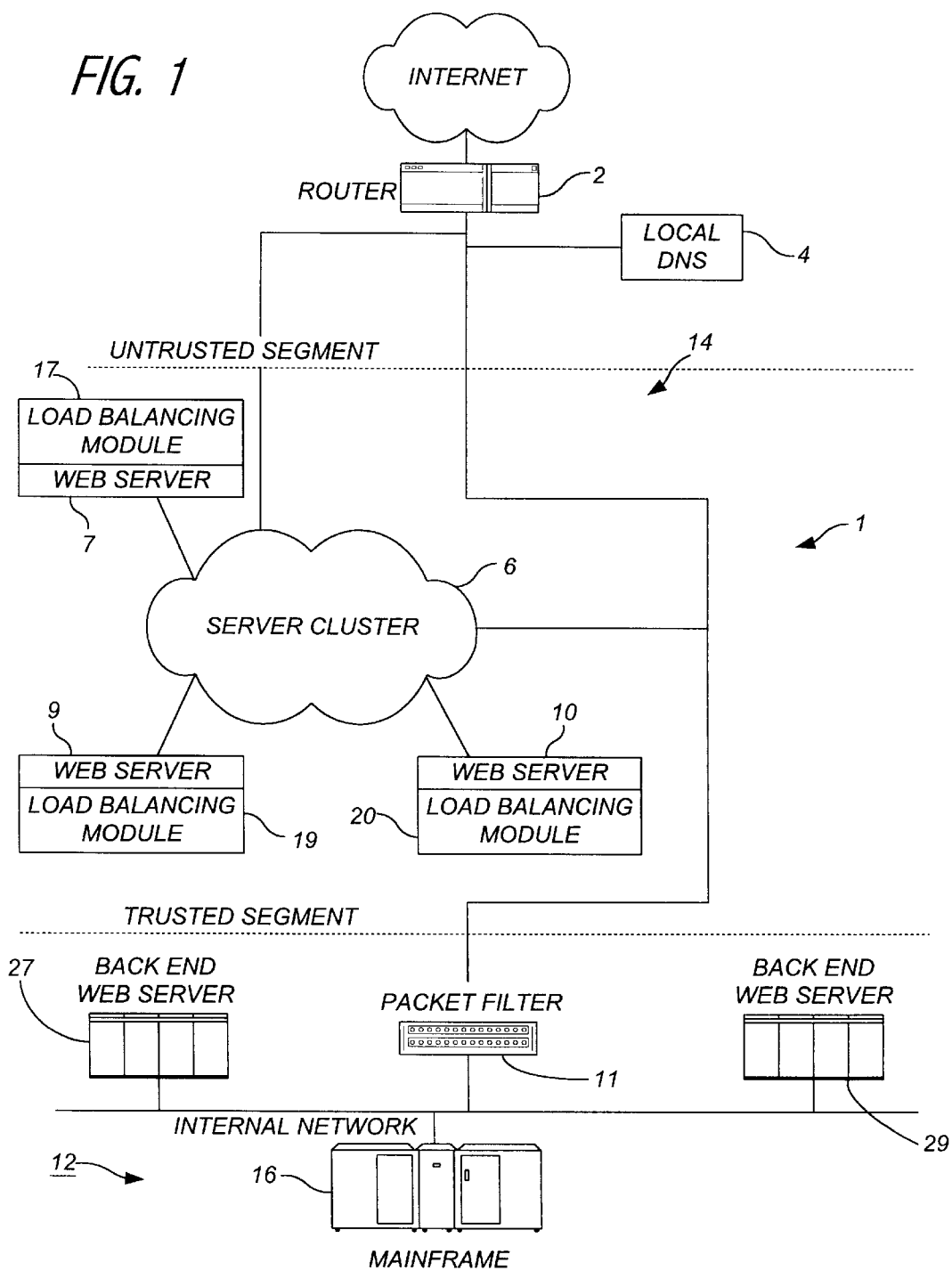

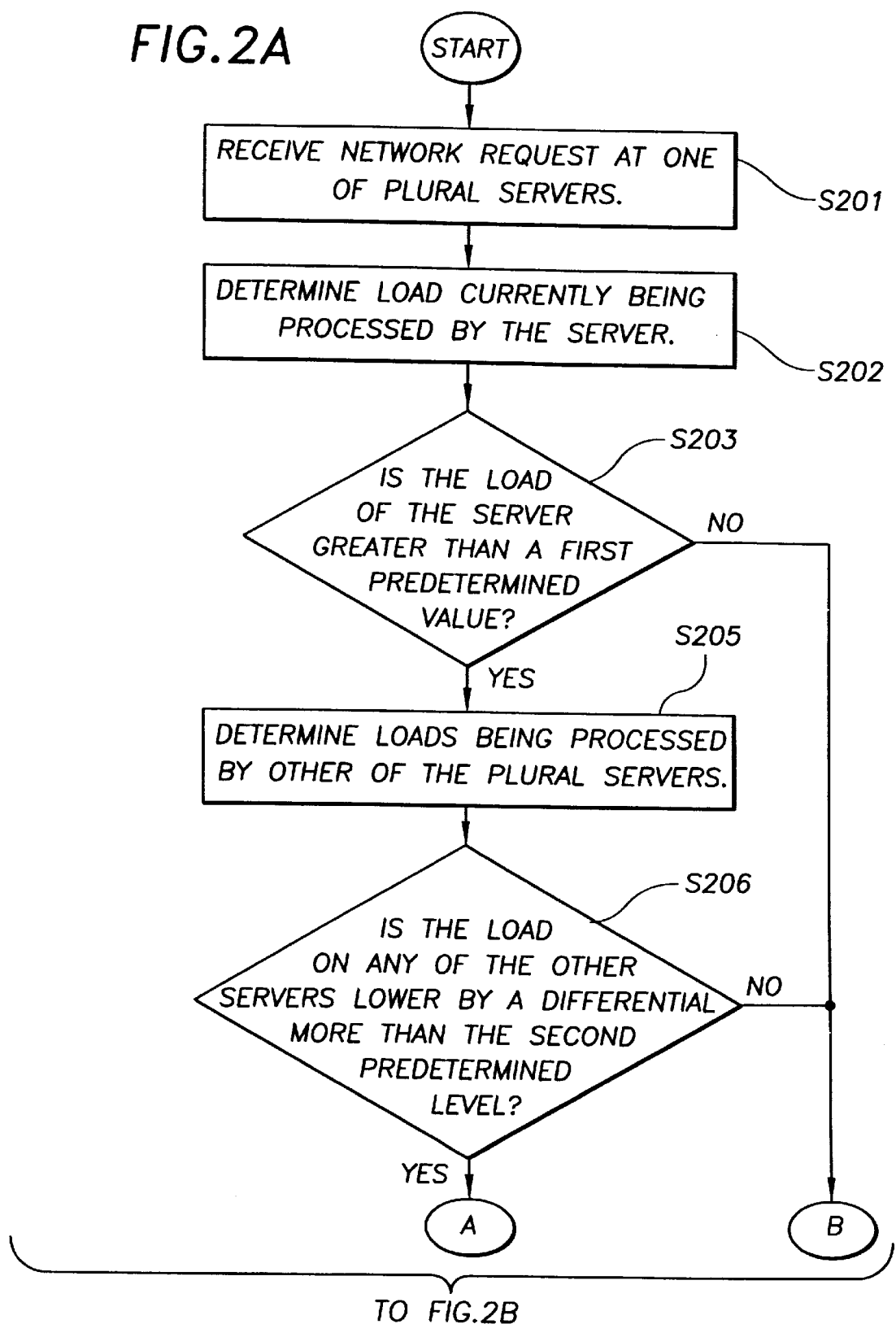

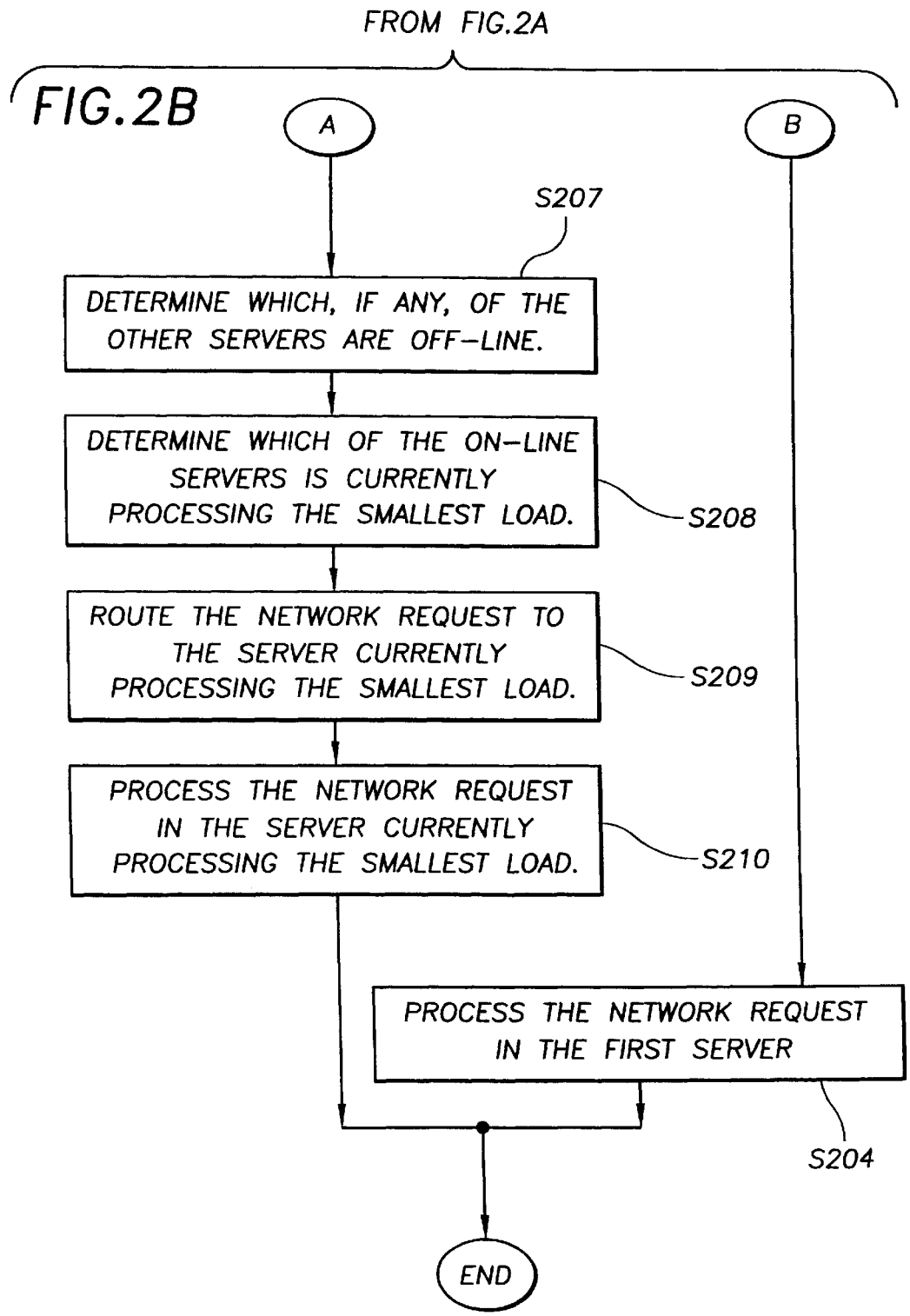

SYSTEM FOR BALANCING LOADS AMONG NETWORK SERVERS

This application claims benefit of U.S. Provisional Ser. Nos. 60/071,039 filed Jan. 13, 1998 and 60/061,170 filed Oct. 6, 1997.

BACKGROUND OF THE INVENTION

The present invention is directed to a peer-to-peer load balancing system which is implemented in plural network servers. In particular, the invention is directed to a computer-executable module for use in network servers which enables each server to distribute loads among its peers based on a load currently being processed in each server and/or contents of the network requests. The invention has particular utility in connection with World Wide Web servers, but can be used with other servers as well, such as CORBA servers, ORB servers, FTP servers, SMTP servers, and Java servers.

Network systems, such as the World Wide Web (hereinafter "WWW"), utilize servers to process requests for information. Problems arise, however, if one server becomes overloaded with requests. For example, if a server becomes overloaded, it may be unable to receive new requests, may be slow to process the requests that it has already received, and may yield server errors.

Load balancing was developed to address the foregoing problems in the art. Briefly, load balancing involves distributing requests among plural servers (e.g., different servers on a Web site) in order to ensure that any one server does not become unduly burdened.

One conventional load balancing technique involves the use of a domain name server (hereinafter "DNS"), in particular a "round-robin" DNS. This device, which typically operates on the network, is responsible for resolving uniform resource locators or "URLs" (e.g., "www.foo.com") to specific IP addresses (e.g., 111.222.111.222). In this regard, a Web site having several servers may operate under a single URL, although each server is assigned a different IP address. A round-robin DNS performs load balancing by routing requests to these servers in sequential rotation based on their IP addresses.

While round-robin DNSs can coarsely distribute loads among several servers, they have several drawbacks. For example, not all requests for connection to a Web site are necessarily received by a round-robin DNS. Rather, many requests will have been previously "resolved" by a DNS local to the requester and remote from the Web site (i.e., a "a remote DNS") or by the requester (i.e., the computer that issued the request on the WWW). In these cases, resolution is based on an address which has been cached in the remote DNS or the requestor, rather than by sequential rotation provided by the Web site's round-robin DNS. Due to this caching, load balancing may not be achieved to a satisfactory degree.

DNS-based load balancing techniques have another significant drawback. In the event that a Web server fails (i.e., the Web server goes off-line), the Web site has no real-time mechanism by which to reroute requests directed to that server (e.g., by a remote DNS). Thus, a remote DNS with caching capabilities could continue to route requests to a failed server for hours, or even days, after the failure has occurred. As a result, a user's connection would be denied with no meaningful error message or recovery mechanism. This situation is unacceptable, particularly for commercial Web sites.

As an alternative to the DNS-based load balancing techniques described above, some vendors have introduced dedicated load balancing hardware devices into their systems. One such system includes a device, called a proxy gateway, which receives all network requests and routes those requests to appropriate Web servers. In particular, the proxy gateway queries the servers to determine their respective loads and distributes network requests accordingly. Responses from the servers are routed back to the network through the proxy gateway. Unlike the DNS-based schemes, all requests resolve to the IP address of the proxy server, thereby avoiding the risk that remote DNS caching or failed servers will inadvertently thwart access to the site.

While proxy gateways address some of the fundamental problems of load balancing described above, they also have several drawbacks. For example, proxy gateways add latency in both the "request" direction and the "response" direction. Moreover, since the proxy gateway is, for all intents and purposes, the only way into or out of a Web site, it can become a bottleneck that limits the capacity of that site to the capacity of the proxy gateway. Moreover, the proxy gateway is also a single point of failure, since its failure alone will prevent access to the Web site.

An IP redirector is a device similar to a proxy gateway which also performs load balancing. Like a proxy gateway, an IP redirector serves as a hub that receives and routes requests to appropriate servers based on the servers' loads. IP redirectors are different from proxy gateways in that IP redirectors do not handle responses to requests, but rather let those responses pass directly from the assigned Web servers to the requesters. However, IP redirectors suffer from many of the same drawbacks of the proxy gateways described above, particularly insofar as limiting the capacity of the Web site and preventing access to it as a result of failure of the IP redirector.

Dedicated load balancers, such as proxy gateways and IP redirectors, also have drawbacks related to sensing loads in different Web servers. Using current technologies, a server can become busy in a matter of milliseconds. A load balancer, however, can only query various servers so often without creating undesirable overhead on the network and in the servers themselves. As a result, such load balancers often must rely on "old" information" to make load balancing decisions. Load balancing techniques which use this "old" information are often ineffective, particularly in cases where such information has changed significantly.

Dedicated load balancers, such as proxy gateways and IP redirectors, also have problems when it comes to electronic commerce transactions. In this regard, electronic commerce transactions are characterized by multiple sequential requests from a single client, where each subsequent request may need to refer to state information provided in an earlier request. Examples of this state information include passwords, credit card numbers, and purchase selections.

Problems with electronic commerce arise because an entire transaction must be serviced by one of plural network servers, since only that one server has the original state information. A load balancer therefore must identify the first request of a stateful transaction and keep routing requests from that requester to the same server for the duration of the transaction. However, it is impossible for the load balancer to know exactly where a transaction begins or ends, since the information in the request providing such indications may be encrypted (e.g., scrambled) when it passes through the dedicated load balancer. In order to maintain an association between one requestor and one server, dedicated load balancers therefore use a mechanism referred to as a "sticky timer". More specifically, the load balancer infers which request may be the start of a stateful transaction and then sets a "sticky timer" of arbitrary duration (e.g., 20 minutes) which routes all subsequent requests from the same requestor to the same Web server, and which renews the "sticky timer" with each subsequent request. This method is easily bypassed and may unnecessarily defeat the load balancing feature.

Thus, there exists a need for a load balancing technique which is able to provide more accurate load balancing than the techniques described above, which is able to perform accurate load balancing despite cached server addresses or "maintained" Web browser addresses, which is not a significant bottleneck or source of single point failure, and which is able to maintain the association between a client and a server in order to preserve state information required to complete an electronic commerce transaction.

SUMMARY OF THE INVENTION

The present invention addresses the foregoing needs by providing, in one aspect, a plurality of network servers which directly handle load balancing on a peer-to-peer basis. Thus, when any of the servers receives a request, the server either processes the request or routes the request to one of its peers—depending on their respective loads and/or on the contents of the request. By implementing load balancing directly on the servers, the need for dedicated load balancing hardware is reduced, as are the disadvantages resulting from such hardware. Thus, for example, because each server has the capability to perform load balancing, access to a Web site managed by the server is not subject to a single point of failure. Moreover, requests tagged with IP addresses cached by remote DNSs or the requestor itself are handled in the same way as other requests, i.e., by being routed among the load balancing-enabled servers.

A network server according to a related aspect of the invention exchanges information with its peers regarding their respective loads. This exchange may be implemented based on either a query/response or unsolicited multicasts among the server's peers, and may be encrypted or may occur over a private communication channel. The exchange may be implemented to occur periodically or may be triggered by a network event such as an incoming request. In a preferred embodiment of the invention, each server multicasts its load information to its peers at a regular period (e.g., 500 ms). This period may be set in advance and subsequently re-set by a user. In the preferred embodiment, the multicast message serves the dual purposes of exchanging load information and of confirming that a transmitting server is still on-line.

By virtue of the foregoing, and by virtue of the server having nearly instantaneous information regarding its own workload, the server is able to make routing determinations based on substantially up-to-date information. The most critical decision, i.e., whether to consider rerouting, is preferably made based on the most current information available (i.e., based on a local server load provided nearly instantaneously from within the server and without any network transmission latency).

In further aspects of the invention, a server processes a received request directly when its load is below a first predetermined level, or if its load is above the first predetermined level yet those of the server's peers are above a second predetermined level. Otherwise, the server routes the request to one of its peers. By equipping a site with multiples servers of this type, it is possible to reduce the chances that one server will become overwhelmed with requests while another server of similar or identical capabilities remains relatively idle.

In other aspects of the invention, the receiving server determines whether to process a request based on its content, e.g., its uniform resource indicator ("URI"). By virtue of this feature of the invention, it is possible to limit the server to processing certain types of network requests, while routing others. Alternatively, it is possible to direct particular requests to particular servers, which then may either process or reroute those requests based on loads currently being handled by the servers.

In other aspects of the invention, the receiving server determines which, if any, of its peer servers are off-line. The server then routes requests to its on-line peers and does not route requests to its off-line peers. A server may also assume the network identity (i.e., the IP address and/or URL) of an off-line peer to insure that requests are serviced properly even if directed to an off-line peer by virtue of caching in a remote DNS. The server would continue to service both its own identity and its assumed identity until the off-line peer returns to on-line service. As a result, it is possible to reduce response errors resulting from requests being inadvertently directed to off-line servers.

In other aspects of the invention, servers may be configured to recognize specific URIs which designate entry points for stateful transactions. A server so configured will not re-route requests away from itself if they are related to a stateful transaction conforming to the URI of the server. Even URIs that arrive in encrypted requests will be decrypted by the server and, therefore, will be subject to intelligent interpretation in accordance with configuration rules. As a result, an electronic commerce transaction comprised of multiple requests may be processed entirely on one of plural servers. Once the transaction is complete, as confirmed by comparing URI information to configuration rules, subsequent requests will again be subject to rerouting for the purpose of load balancing.

This brief summary has been provided so that the nature of the invention may be understood quickly. A more complete understanding of the invention can be obtained by reference to the following detailed description of the preferred embodiments thereof in connection with the attached drawings.

BRIEF DESCRIPTION OF THE DRAWINGS

A more complete understanding of the invention may be attained by reference to the drawings, in which:

FIG. 1 is a diagram showing the topology of a Web site including the present invention;

FIG. 2, comprised of FIGS. 2A and 2B, is a flow diagram showing process steps for distributing requests among various servers based on the loads being handled by them;

DETAILED DESCRIPTION OF THE ILLUSTRATED EMBODIMENTS

Figure 3:
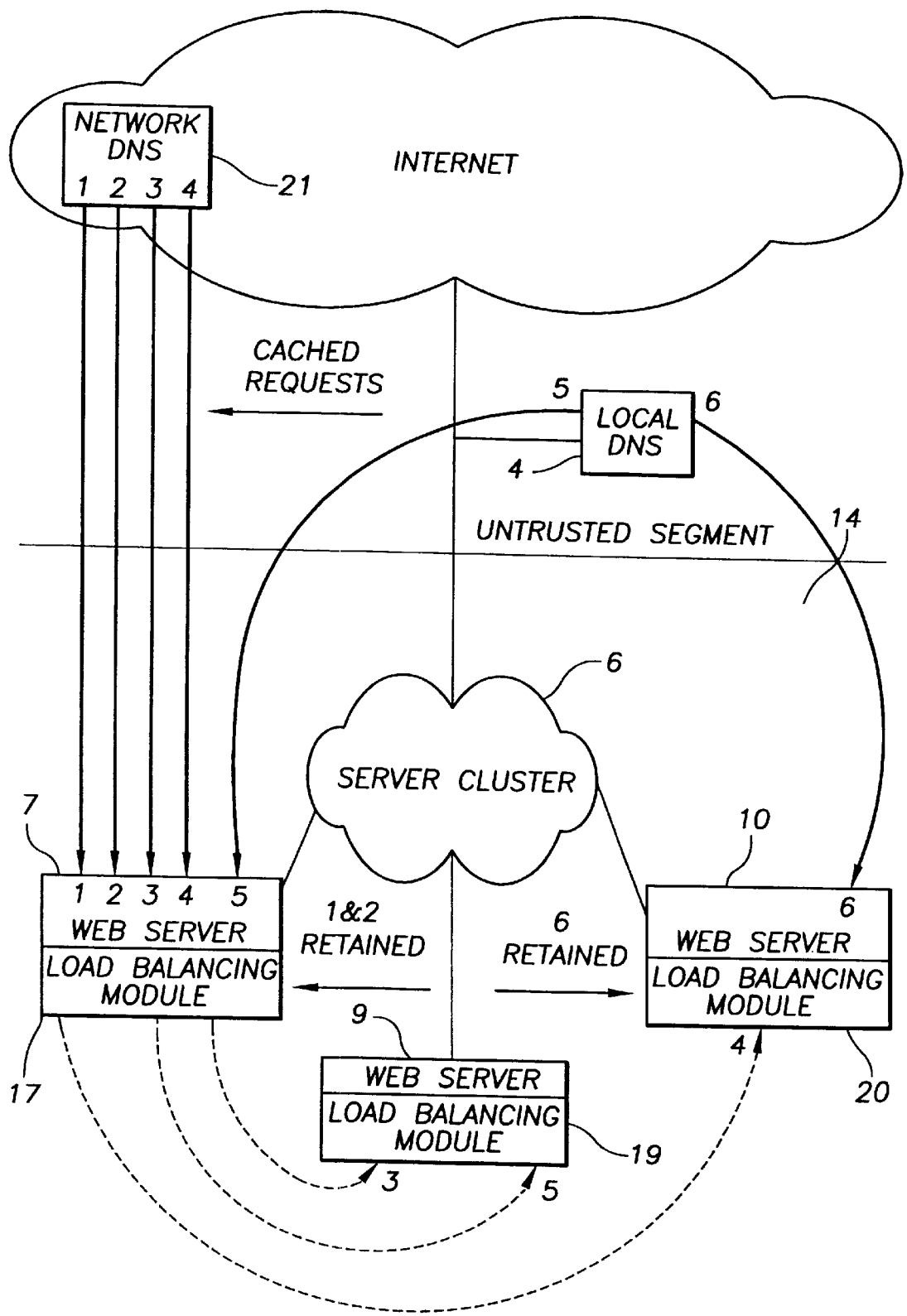
FIG. 3 is a more detailed view of a portion of the topology shown in FIG. 1 relating to load balancing.

The present invention is directed to a system for implementing peer-to-peer load balancing among plural network servers. Although the invention will be described in the context of the World Wide Web ("WWW"), and more specifically in the context of WWW servers, it is not limited to use in this context. Rather, the invention can be used in a variety of different types of network systems with a variety of different types of servers. For example, the invention can be used in intranets and local area networks, and with CORBA servers, ORB servers, FTP servers, SMTP servers, and Java servers, to name a few.

FIG. 1 depicts the topology of a Web site 1 which includes the present invention, together with hardware for accessing that Web site from a remote location on the Internet. More specifically, FIG. 1 shows router 2, local DNS 4, server cluster 6 comprised of Web servers 7, 9 and 10, packet filter 11, and internal network 12. A brief description of this hardware is provided below.

Router 2 receives requests for information stored on Web site 1 from a remote location (not shown) on the Internet. Router 2 routes these requests, which typically comprise URLs, to local DNS 4. Local DNS 4 receives a URL from router 2 and resolves the domain name in the URL to a specific IP address in server cluster 6.

Server cluster 6 is part of the untrusted segment 14 of Web site 1, to which access is relatively unrestricted. Server cluster 6 is comprised of a plurality of servers, including servers 7, 9 and 10. Each of these servers is capable of retrieving information from internal network 12 in response to requests resolved by a remote DNS on the Internet or by local DNS 4. Included on each of servers 7, 9 and 10 is a microprocessor (not shown) and a memory (not shown) which stores process steps to effect information retrieval. In preferred embodiments of the invention, each memory is capable of storing and maintaining programs and other data between power cycles, and is capable of being reprogrammed periodically. An example of such a memory is a rotating hard disk.

The memory on each server also stores a computer-executable module (i.e., a heuristic) comprised of process steps for performing the peer-to-peer load balancing technique of present invention. More specifically, server 7 includes load balancing module 17, server 9 includes load balancing module 19, and server 10 includes load balancing module 20. The process steps in these modules are executable by the microprocessor on each server so as to distribute requests among the Web servers. In more detail, the process steps include, among other things, code to receive a request from a remote source at a first one of the Web servers (e.g., server 7), code to determine whether to process the request in the first server, code to process the request in the first server in a case that the determining code determines that the request should be processed in the first server, and code to route the request to another server (e.g., server 9) in a case that the determining code determines that the request should not be processed in the first server. A more detailed description of the load balancing technique implemented by these process steps is provided below.

Packet filter 11 comprises a firewall for internal network 12 (i.e., the trusted segment) of Web site 1. All transactions into or out of internal network 12 are conducted through packet filter 11. In this regard, packet filter 11 "knows" which inside services of internal network 12 may be accessed from the Internet, which clients are permitted access to those inside services, and which outside services may be accessed by anyone on internal network 12. Using this information, packet filter 11 analyzes data packets passing therethrough and filters these packets accordingly, restricting access where necessary and allowing access where appropriate.

Internal network 12 includes mainframe 16 and back-end Web servers 27 and 29. Back-end Web servers 27 and 29 comprise file servers which store a database for Web site 1. Back-end Web servers 27 and 29 may be used to access data files on mainframe 16 (or other similar computer) in response to requests from server cluster 6. Once such data files have been accessed, mainframe 16 may then transmit these files back to server cluster 6. Alternatively, data on back-end Web servers 27 and 29 may be accessed directly from server cluster 6 without the aid of mainframe 16.

First Embodiment

FIG. 2 illustrates process steps of the present invention for load balancing received network requests. To begin, in step S201 a network request is received at a server, such as server 7 show in FIG. 3. This request may be resolved by a remote DNS on the Internet based on a cached IP address (e.g., requests 1, 2, 3 and 4) or, alternatively, the request may be resolved by a local round-robin DNS 4 (e.g., request 5). Then, in step S202, server 7 determines a load (e.g., the number and/or complexity of network requests) that it is currently processing, and the capacity remaining therein.

Step S203 decides if the load currently being processed in server 7 exceeds a first predetermined level. In preferred embodiments of the invention, this predetermined level is 50%, meaning that server 7 is operating at 50% capacity. Of course, the invention is not limited to using 50% as the first predetermined level. In this regard, a value for the first predetermined level may be stored in a memory on server 7, and may be reprogrammed periodically.

If step S203 decides that server 7 is not processing a load that exceeds the first predetermined level, flow proceeds to step S204. In step S204, the network request is processed in server 7, and a response thereto is output via the appropriate channels. On the other hand, in a case that step S203 determines that server 7 is processing a load that exceeds the first predetermined level, flow proceeds to step S205.

Step S205 determines loads currently being processed by server 7's peers (e.g., servers 9 and 10 shown in FIG. 3). In more detail, in step S205, load balancing module 17 compares its current load information with the most recent load information provided by load balancing modules 19 and 20. These load balancing modules continuously exchange information regarding their respective loads, so that this information is instantly available for comparison. In the example shown in FIG. 3, load balancing module 19 provides information concerning the load currently being processed by server 9, and load balancing module 20 provides information concerning the load currently being processed by server 10.

In step S206, load balancing module 17 determines whether the loads currently being processed by server 7's peers are less than the load on server 7 by a differential exceeding a second predetermined level. In preferred embodiments of the invention, this second predetermined level is 20%, which provides a means of assessing whether servers 9 or 10 have at least 20% more of their capacities available than server 7. Of course, the invention is not limited to using 20% as the second predetermined level. In this regard, as above, a value for the second predetermined level may be stored in a memory on server 7, and may be reprogrammed periodically.

In a case that step S206 decides that server 7's peers (i.e., servers 9 and 10) do not have 20% more of their capacity available, flow proceeds to step S204. In step S204, the network request is processed in server 7, and a response thereto is output via the appropriate channels. On the other hand, in a case that step S206 decides that at least one of server 7's peers is processing a load that is less than the percent load on server 7 by the second predetermined level, flow proceeds to step S207.

Step S207 determines which, if any, of the servers at Web site 1 are off-line based, e.g., on the load information exchange (or lack thereof) in step S205. A server may be off-line for a number of reasons. For example, the server may be powered-down, malfunctioning, etc. In such cases, the servers' load balancing modules may be unable to respond to a request from load balancing module 17 or otherwise be unable to participate in an exchange of information, thereby indicating that those servers are off-line. In addition, in preferred embodiments of the invention, the load balancing modules are able to perform diagnostics on their respective servers. Such diagnostics test operation of the servers. In a case that a server is not operating properly, the server's load balancing module may provide an indication to load balancing module 17 that network requests should not be routed to that server.

Next, step S208 analyzes load information from on-line servers in order to determine which of the on-line servers is processing the smallest load. Step S208 does this by comparing the various loads being processed by other servers 9 and 10 (assuming that both are on-line). Step S209 then routes the network request to the server which is currently processing the smallest load. In the invention, routing is performed by sending a command from load balancing module 17 to a requestor instructing the requestor to send the request to a designated server. Thus, re-routing is processed automatically by the requestor software and is virtually invisible to the actual Internet user.

Thereafter, that server processes the request in step S210. At this point, it is noted, however, that the invention is not limited to routing the request to a server that is processing the smallest load. Rather, the invention can be configured to route the request to any server that is operating at or below or predetermined capacity, or something similar such as, but not limited to, a round-robin hand-off rotation.

FIG. 3 illustrates load distribution according to the present invention. More specifically, as noted above, server 7 (more specifically, load balancing module 17) receives requests 1, 2, 3 and 4 resolved by network DNS 21 and request 5 via local DNS 4. Similarly, server 10 receives request 6 (i.e., a cached request) via local DNS 4. Any of these requests may be "boolanarked" requests, meaning that they are specifically addressed to one server. Once each load balancing module receives a request, it determines whether to process that request in its associated server or to route that request to another server. This is done in the manner shown in FIG. 2. By virtue of the processing shown in FIG. 2, load balancing modules 17, 19 and 20 distribute requests so that server 7 processes requests 1 and 2, server 9 processes requests 3 and 5, and server 10 processes requests 4 and 6.

Second Embodiment

In the second embodiment of the invention, load balancing is performed based on a content of a network request, in this case a URL/URI. As noted above, a URL addresses a particular Web site and takes the form of "www.foo.com". A URI, on the other hand, specifies information of interest at the Web site addressed by the URL. For example, in a request such as "www.foo.com/banking", "/banking" is the URI and indicates that the request is directed to information at the "foo" Web site that relates to "banking". In this embodiment of the invention, URIs in network requests are used to distribute requests among servers.

Figure 4:
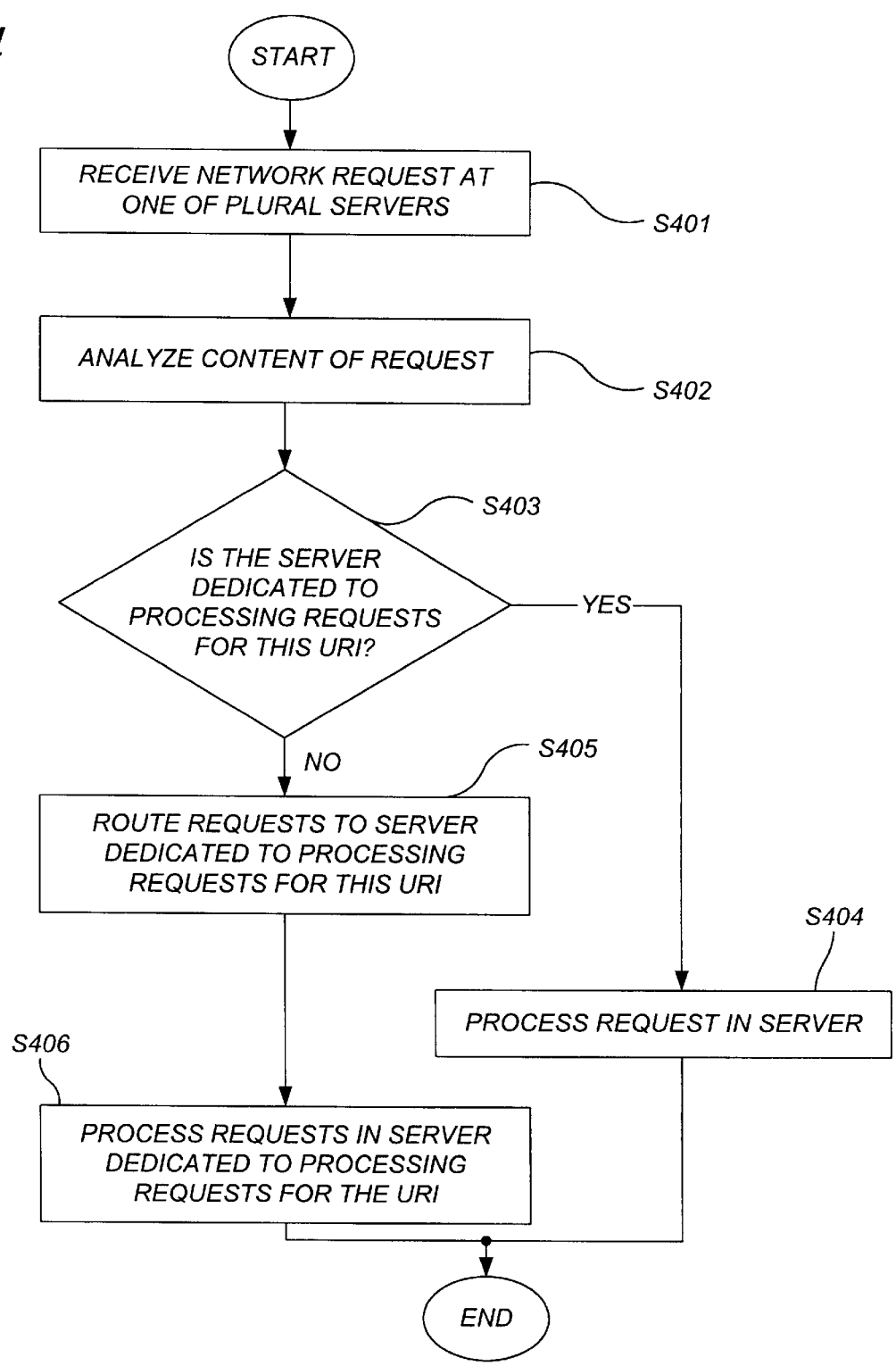
FIG. 4 is a flow diagram showing process steps for distributing requests among various servers based on the content of the requests.

FIG. 4 is a flow diagram illustrating process steps comprising this embodiment of the invention. To begin, in step S401, load balancing module 17 receives a request from either network DNS 21 or from local DNS 4 (see FIG. 3). In step S402, the load balancing module then analyzes the request to determine its content. In particular, load balancing module 17 analyzes the request to identify URIs (or lack thereof) in the request.

Step S402 determines which server(s) are dedicated to processing which URIs, and which server(s) are dedicated to processing requests having no URI. That is, in the invention, the load processing module of each server is configured to accept requests for one or more URIs, thus limiting the server to processing requests for those URIs. For example, load balancing module 17 may be configured to accept requests with a URI of "/banking", whereas load balancing module 19 may be configured to accept requests with a URI of "/securities". Which server processes which URI may be "hard-coded" within the server's loading balancing module, stored within the memory of each server, or obtained and updated via a dynamic protocol.

In any event, in a case that step S403 decides that server 17 is dedicated to processing LRIs of the type contained in the request (or no URI, whichever the case may be), flow proceeds to step S404. In step S404, the request is accepted by load balancing module 17 and processed in server 7, whereafter processing ends. On the other hand, in a case that step S403 decides that server 7 does not process URIs of the type contained in the request, flow proceeds to step S405. This step routes the request to one of server 7's peers that is dedicated to processing requests containing such URIs. Routing is performed in the same manner as in step S209 of FIG. 2. Once the request is received at the appropriate server, the load balancing module associated therewith accepts the request for processing by the server in step S406, whereafter processing ends.

Third Embodiment

The first and second embodiments of the invention described above can be combined into a single embodiment which routes network requests based on both a content of the request and loads being handled by the various servers. More specifically, in this embodiment of the invention, each load balancing module is configured to route a request to a server dedicated to a particular URI in a case that the server is operating at less than a predetermined capacity. In a case that the server is operating at above the predetermined capacity, the invention routes the requests to another server which can handle requests for the URI, but which is operating at below the predetermined capacity. The methods for performing such routing are described above with respect to the first and second embodiments of the invention.

Fourth Embodiment

Figure 5:
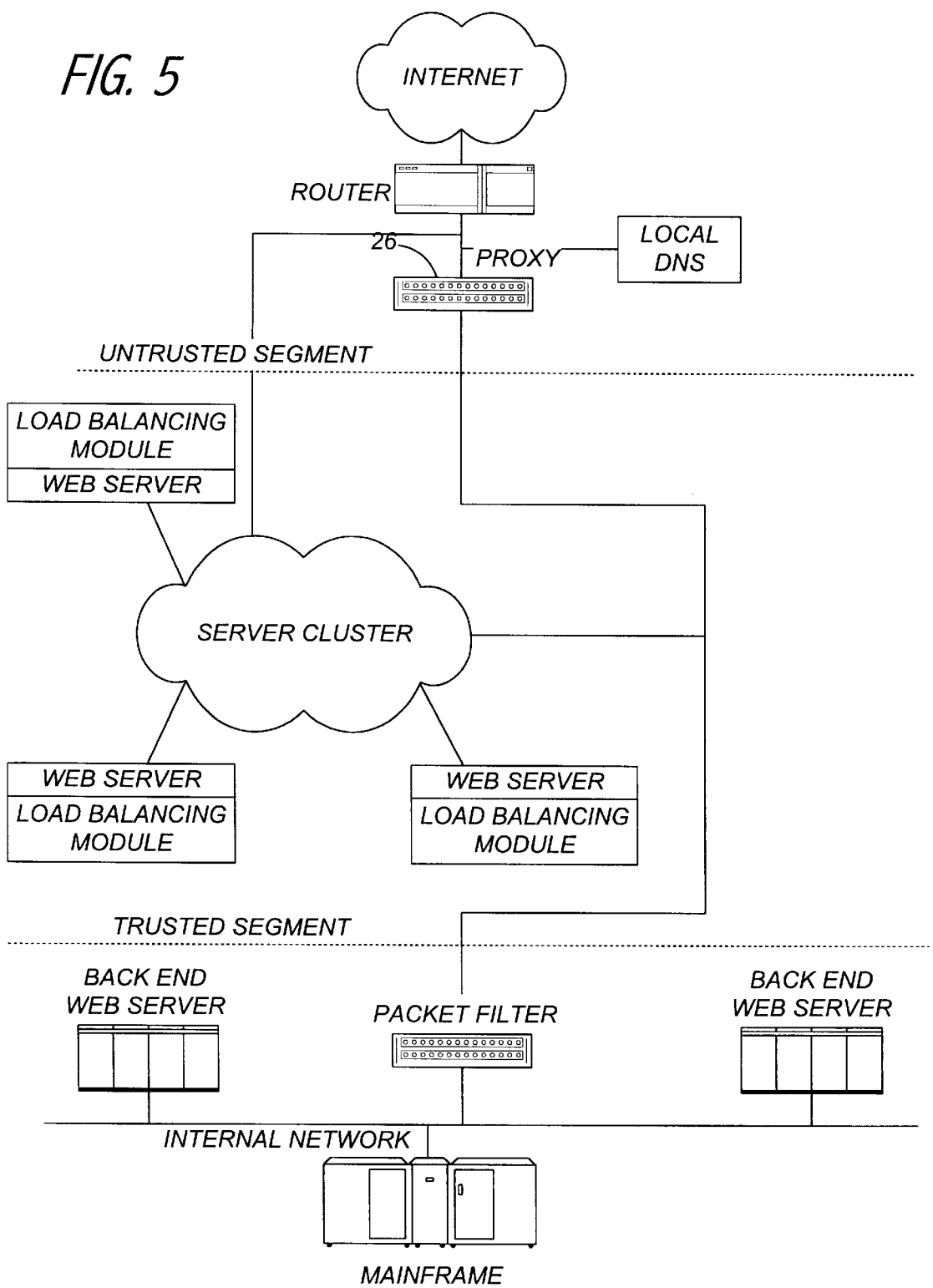
FIG. 5 is a diagram showing the topology of a Web site including the present invention and a proxy.

As noted above, the present invention reduces the need for a proxy gateway or similar hardware for distributing loads among various Web servers. It is noted, however, that the invention can be used with such hardware. FIG. 5 shows the topology of a Web site on which the present invention is implemented, which also includes proxy 26.

In this regard, except for proxy 26, the features show in FIG. 5 are identical in both structure and function to those shown in FIG. 1. With respect to proxy 26, proxy 26 is used to receive network requests and to route those requests to appropriate servers. A load balancing module on each server then determines whether the server can process requests routed by proxy 26 or whether such requests should be routed to one of its peers. The process for doing this is set forth in the first, second and third embodiments described above.

Fifth Embodiment

This embodiment of the invention is directed to a system for maintaining an association between a requester and one of plural servers at a Web site when state information is used during an electronic transaction.

More specifically, in accordance with this embodiment of the invention, a server at a Web site, such as server 7 shown in FIG. 1, is configured to recognize specific URIs (e.g., URIs that designate entry points for a stateful transaction relating to electronic commerce). In the case that one of these URIs is recognized, the server will not route subsequent transactions away from that server, thereby ensuring that all such requests are processed by that server. Requests may again be re-routed from the server once a URI which matches a predetermined "configuration rule" is detected (e.g., when a transaction is complete).

In preferred embodiments of the invention, wild card URI information may be used to designate a stateful path. For example, the hyperlink "http://www.foo.com/ banking/*" would mean that "http://www.foo.com/banking/" constitutes the entry point into a stateful transaction. Any request up to and including this point would be subject to potential re-routing. Any request further down this path would indicate that the requestor and the server are engaged in a stateful transaction and not subject to potential re-routing.

The present invention has been described with respect to particular illustrative embodiments. It is to be understood that the invention is not limited to the above-described embodiments and modifications thereto, and that various changes and modifications may be made by those of ordinary skill in the art without departing from the spirit and scope of the appended claims.

In view of the foregoing, what we claim is:

1. A method of distributing requests among a plurality of network servers, the method comprising the steps of:

receiving a request from a remote source at a first one of the network servers;

executing a determining step in the first server, the determining step for determining whether to process the request in the first network server;

processing the request in the first network server in a case that the determining step determines that the request should be processed in the first network server; and routing the request to another network server in a case that the determining step determines that the request should not be processed in the first network server;

wherein the determining step comprises the steps of:

determining a load currently being processed by the first network server; and receiving information in the first network server from each of the other network servers, the information from each of the other network servers comprising information concerning a load currently being processed in each network server;

wherein the determining step determines that the first network server should process the request in a case that (i) the load currently being processed in the first network server is below a first predetermined level, or (ii) the load currently being processed in the first network server is above the first predetermined level and is above loads currently being processed by either of the other network servers by less than a second predetermined level; and wherein the determining step determines that the first network server should not process the request in a case that the load currently being processed in the first network server is above the first predetermined level and a load currently being processed in at least one of the other network servers is below the level of the first network server by at least the second predetermined level.

2. Computer-executable process steps stored on a computer-readable medium, the computer executable process steps comprising a server module which is installable in a plurality of network servers to distribute requests among the plurality of network servers, the computer-executable process steps comprising:

code to receive a request from a remote source at a first one of the network servers;

code, executable by the first server, to determine whether to process the request in that server;

code to process the request in the first network server in a case that the determining code determines that the request should be processed in the first network server; and code to route the request to another network server in a case that the determining code determines that the request should not be processed in the first network server;

wherein the determining code comprises:

code to determine a load currently being processed by the first network server; and code to receive information in the first network server from each of the other network servers, the information from each of the other network servers comprising information concerning a load currently being processed in each network server;

wherein the determining code determines that the first network server should process the request in a case that (i) the load currently being processed in the first network server is below a first predetermined level, or (ii) the load currently being processed in the first network server is above the first predetermined level and is above loads currently being processed by either of the other network servers by less than a second predetermined level; and wherein the determining code determines that the first network server should not process the request in a case that the load currently being processed in the first network server is above the first predetermined level and a load currently being processed in at least one of the other network servers is below the level of the first network server by at least the second predetermined level.

3. A network server which is capable of processing requests and of distributing the requests among a plurality of other network servers, the network server comprising:

a memory which stores a module comprised of computer-executable process steps; and a processor which executes the process steps stored in the memory so as (i) to receive a request from a remote source at the network server, (ii) to determine whether to process the request in the network server by executing process steps so as (a) to determine a load currently being processed by the first network server, and (b) to receive information in the first network server from each of the other network servers, the information from each of the other network servers comprising information concerning a load currently being processed in each network server;

wherein the processor determines that the first network server should process the request in a case that (i) the load currently being processed in the first network server is below a first predetermined level, or (ii) the load currently being processed in the first network server is above the first predetermined level and is above loads currently being processed by either of the other network servers by less than a second predetermined level; and wherein the processor determines that the first network server should not process the request in a case that the load currently being processed in the first network server is above the first predetermined level and a load currently being processed in at least one of the other network servers is below the level of the first network server by at least the second predetermined level;

(iii) to process the request in the network server in a case that the processor determines that the request should be processed in the network server, and (iv) to route the request to another one of the plurality of network servers in a case that the processor determines that the request should not be processed in the network server.

4. A method of distributing requests among a plurality of network servers, the method comprising the steps of:

receiving a request from a remote source at a first one of the network servers;

executing a determining step in the first server, the determining step for determining whether to process the request in the first network server;

processing the request in the first network server in a case that the determining step determines that the request should be processed in the first network server; and routing the request to another network server in a case that the determining step determines that the request should not be processed in the first network server;

wherein the determining step comprises determining whether the request is related to a stateful transaction based on a URI in the request; and wherein (i) in a case that the request is related to a stateful transaction, determining that the request should be processed in the first network server, and (ii) in a case that the request is not related to a stateful transaction, determining if the request should be processed in the first network server.

5. A method according to claim 4, wherein, in a case that the request is related to a stateful transaction, determining that at least a second request having a URI substantially the same as the URI of the request should be processed in the first network server.

6. Computer-executable process steps stored on a computer-readable medium, the computer executable process steps comprising a server module which is installable in a plurality of network servers to distribute requests among the plurality of network servers, the computer-executable process steps comprising:

code to receive a request from a remote source at a first one of the network servers;

code, executable by the first server to determine whether to process the request in that server;

code to process the request in the first network server in a case that the determining code determines that the request should be processed in the first network server; and code to route the request to another network server in a case that the determining code determines that the request should not be processed in the first network server;

wherein the determining code comprises code to determine whether the request is related to a stateful transaction based on a URI in the request; and wherein (i) in a case that the request is related to a stateful transaction, the determining code determines that the request should be processed in the first network server, and (ii) in a case that the request is not related to a stateful transaction, the determining code determines if the request should be processed in the first network server.

7. Computer-executable process steps according to claim 6, wherein, in a case that the request is related to a stateful transaction, the code to determine determines that at least a second request having a URI substantially the same as the URI of the request should be processed in the first network server.

8. A network server which is capable of processing requests and of distributing the requests among a plurality of other network servers, the network server comprising:

a memory which stores a module comprised of computer-executable process steps; and a processor which executes the process steps stored in the memory so as (i) to receive a request from a remote source at the network server, (ii) to determine whether the request should be processed in the network server by determining whether the request is related to a stateful transaction based on a URI in the request;

wherein (i) in a case that the request is related to a stateful transaction, the processor determines that the request should be processed in the network server, and (ii) in a case that the request is not related to a stateful transaction, the processor determines if the request should be processed in the network server;

(iii) to process the request in the network server in a case that the processor determines that the request should be processed in the network server, and (iv) to route the request to another one of the plurality of network servers in a case that the processor determines that the request should not be processed in the network server.

9. A network server according to claim 8, wherein, in a case that the request is related to a stateful transaction, the processor determines that at least a second request having a URI substantially the same as the URI of the request should be processed in the network server.

\* \* \* \* \*